United States Patent [19]
Stern

[11] Patent Number: 5,528,287
[45] Date of Patent: Jun. 18, 1996

[54] MULTI-LEVEL RETARDER PLATE POLARIZATION DEPENDENT IMAGING

[75] Inventor: Howard Stern, Greenlawn, N.Y.

[73] Assignee: Robotic Vision Systems, Inc., Hauppauge, N.Y.

[21] Appl. No.: 500,703

[22] Filed: Jul. 11, 1995

Related U.S. Application Data

[63] Continuation of Ser. No. 963,840, Oct. 19, 1992, Pat. No. 5,475,370.

[51] Int. Cl.⁶ ................................................. H04N 5/225
[52] U.S. Cl. ............................ 348/25; 348/61; 348/273; 348/335; 348/340
[58] Field of Search ............................... 348/25, 61, 335, 348/336, 340, 273; H04N 7/18, 5/225

[56] References Cited

U.S. PATENT DOCUMENTS

| H515 | 8/1988 | Holt | 348/25 |
|---|---|---|---|
| 4,091,415 | 5/1978 | Limb | 348/25 |
| 4,682,222 | 7/1987 | Smith | 348/164 |
| 5,020,920 | 6/1991 | Gopalsami | 374/57 |
| 5,208,674 | 5/1993 | Setchell | 348/273 |
| 5,287,183 | 2/1994 | Thomas | 348/571 |
| 5,475,370 | 12/1995 | Stern | 340/583 |

Primary Examiner—Howard W. Britton
Attorney, Agent, or Firm—Thomas R. Morrison; Christopher R. Pastel

[57] ABSTRACT

A system for detecting the presence of an energy polarization altering dielectric material, such as ice or snow, on a surface, such as a part of an aircraft, which normally specularly reflects incident energy, such as light, when there is no such dielectric present. The energy is conveyed from a transmitter along a path to the surface and the incident energy is reflected from the surface along a path to a receiver with a dielectric on the surface destroying any polarization, such as circular, of the energy and that reflected from a specular portion maintaining the polarization. An optical system in one or both of the paths operates in an isolator state to produce an image of the dielectric portion having a first intensity level and that of the specular portion passing through the optical system having a different intensity level. When the optical system is operated alternately in isolator and non-isolator states it produces an image of the dielectric portion having a relatively steady intensity level and that of the specular portion alternating between first and second different intensity levels corresponding to the isolator and non-isolator states of the optical system.

4 Claims, 8 Drawing Sheets

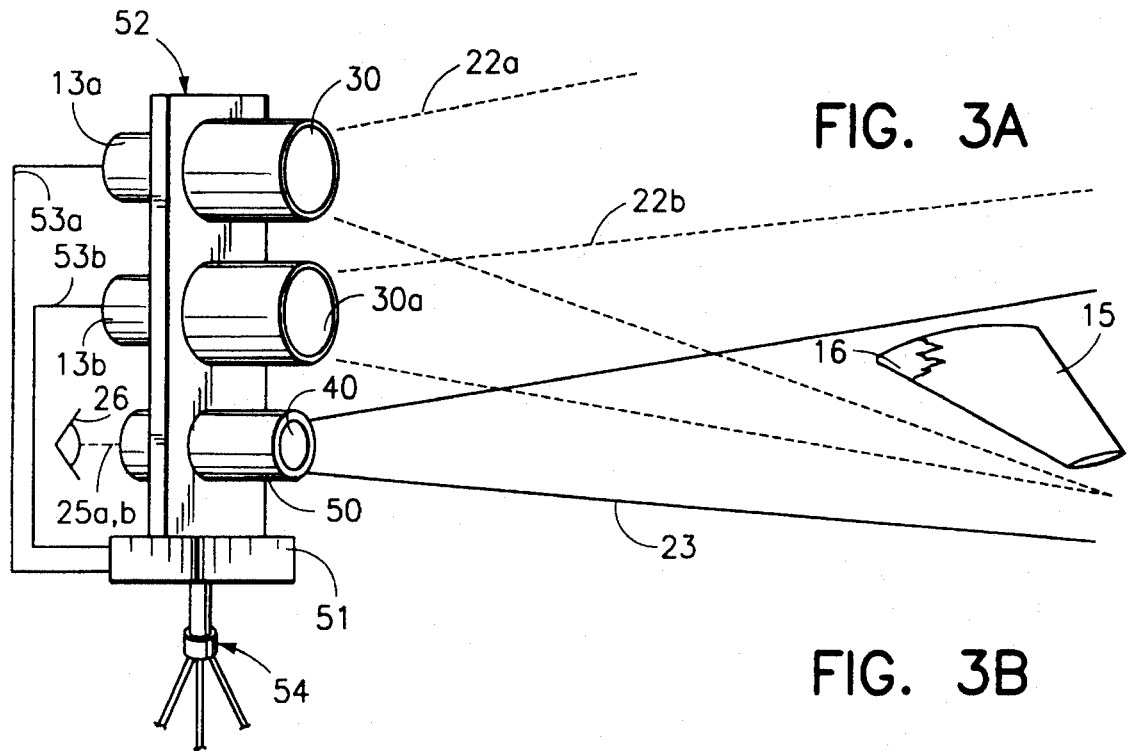
FIG. 3A
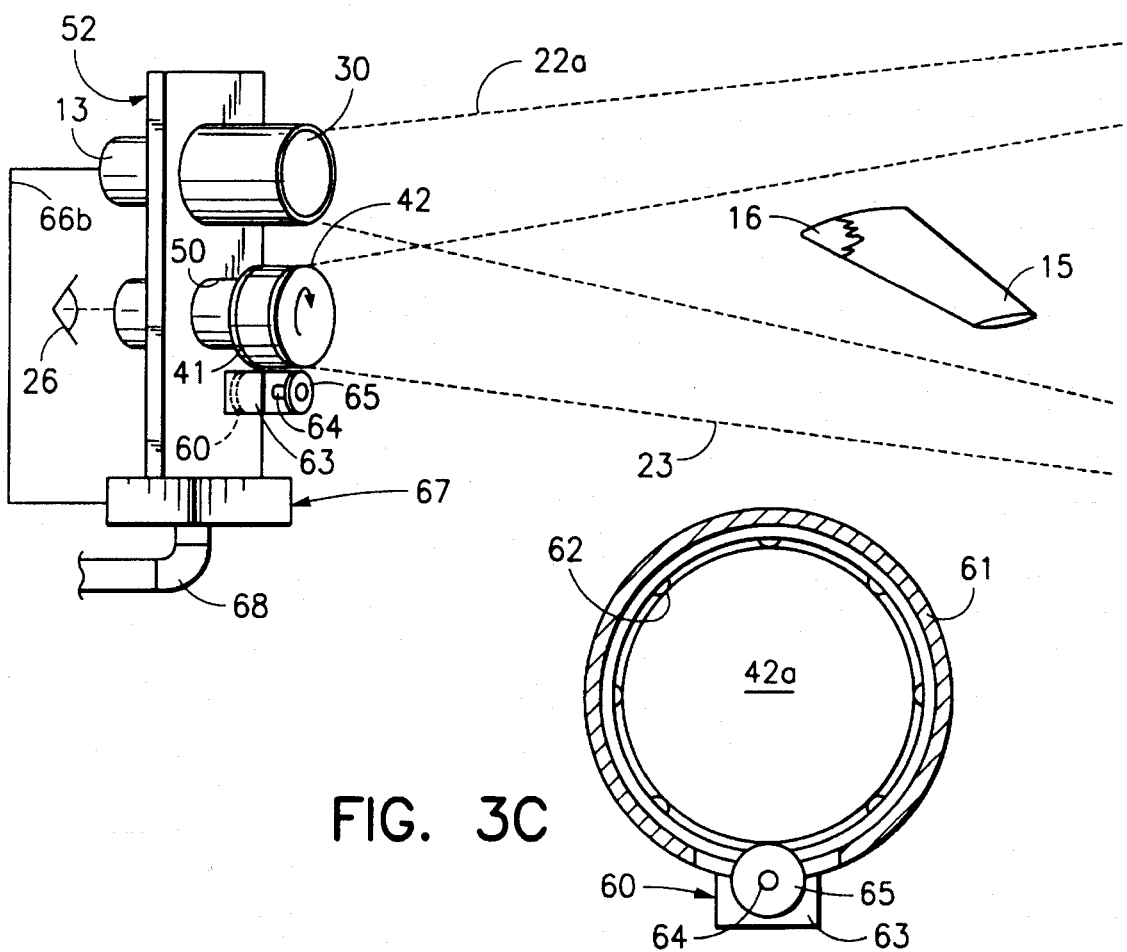
FIG. 3B
FIG. 3C

MULTI-LEVEL RETARDER PLATE POLARIZATION DEPENDENT IMAGING

This is a continuation of patent application Ser. No. 07/963,840, filed Oct. 20, 1992, and herewith at the time of filing the present continuing application now U.S. Pat. No. 5,475,370.

BACKGROUND OF THE INVENTION

Current airport aviation practices depend on the use of de-icing fluid to remove ice and prevent its future build-up for time periods of 5–10 minutes. Verification that wing and other aerodynamic or control surfaces are ice free is done visually, often under difficult viewing conditions. Occasionally significant ice build-ups are not noticed, with tragic results. Responsibility for detecting such ice rests with the aircraft crew who rely on visual viewing, perhaps supplemented with an ordinary flashlight. Obviously, a need exists for a system which is capable of accurately and easily determining the presence of ice on an aircraft wing.

SUMMARY OF THE INVENTION

Metallic surfaces and dielectric surfaces behave differently when illuminated with light, particularly with respect to their polarization properties. One of the strongest differences and most easily observable is the property of metals to reverse the rotational direction of circularly polarized light. For example, the specular reflection of right handed (clockwise looking towards the source) circularly polarized light from a metal surface changes it to left handed (counterclockwise) polarization and vice versa. This effect is used in the construction of optical isolators which permit light to initially pass through the isolator but prevent specularly reflected light from returning through the isolator back to the source. The optical isolator is a circular polarizer that is usually implemented from a linear polarizer and a quarter wave retarder plate that has its fast and slow axes located 45° from the polarization axis of the polarizer. The polarizer must precede the retarder in the light path.

When a metallic surface (or surface painted with a metallic paint), such as the wing of an aircraft, is illuminated with circularly polarized light (which may be generated by passing unpolarized light through a circular polarizer) and the reflected energy viewed through the same circular polarizer, the resulting image is extremely dim since the circular polarizer is performing as an isolator with respect to the specular reflection from the metal surface. Other types of surfaces (dielectric, matte, etc.) viewed through the same circular polarizer maintain their normal brightness because upon reflection they destroy the circular polarization. If the circular polarizer is flipped (reversed) so that the retarder precedes the polarizer, it no longer acts as an isolator for the illuminating beam and the metallic surface's image will now be viewed of normal (bright) intensity.

Most non-metallic and painted or matte surfaces illuminated with circularly polarized light and viewed through the same circular polarizer will approximately maintain their normal intensity. Such surfaces, as well as a coat of ice on the metal, whether matte white due to a snow covering or crystal clear due to even freezing will destroy the circular polarization of the reflected light and therefore take on the depolarizing property of a matte painted surface with respect to the optical isolator. A transparent dielectric over metal depolarizes circularly polarized light passing through it if it has numerous internal point scatterers or is birefringent. Ice has this characteristic. Thus, circularly polarized light reflected from a painted surface, snow, ice, or even transparent ice over metal will be depolarized and will not be affected by the isolator.

Therefore, the image of a clear metal surface that is ice-free will alternate between dark and bright when alternately viewed through an isolator and non-isolator structure, respectively. Apparatus other than the combination of optical isolators and non-isolators via circular polarizers can produce the same effect. Any ice or snow covering the metal surface will cause the image to maintain the same brightness regardless of whether it is viewed through an isolator or non-isolator structure or equivalent structures.

The present invention provides various arrangements for inspecting a metal surface for the presence of ice which compares views of the surface in an optical isolating and non-isolating manner. Making such comparisons in an alternating manner results in the metal surface producing a blinking, on-off, viewing of the reflected light and the ice producing a steady level of illumination.

In accordance with the invention, various embodiments are provided for inspecting a metallic surface in which there is a comparison or switching between an optical isolator structure and non-isolator structure. In one embodiment, switching is implemented by switching the light illuminating the metal surface between circularly polarized and non-circularly polarized light while observing through a circular polarizing filter of the same hand, i.e., CW or CCW, as required to complete the isolator. In another embodiment, the light illuminating the surface may be kept circularly polarized but viewed alternately through a circular polarizer of the same hand and a non-circular polarizing element having the same optical attenuation. This is most easily accomplished by viewing through the same type of circular polarizer flipped over (reflected light enters the polarizing element first) to keep it from acting as the circular to linear polarizing element of an isolator while simultaneously maintaining the slight light attenuation of its elements.

Another embodiment maintains the illumination in a circularly polarized state and alternately views the scene through right handed and left handed circular polarizers which will alternately change between the isolating and non-isolating states. A non-isolating state may also be achieved by rotating either the receiver or transmitter quarter wave retarder plate forming a part of the polarizer by 45°. This aligns the slow or fast axis of the retarder with its polarizer. The effect is that, if done at the transmitter, linearly polarized light passing through the quarter wave plate remains linearly polarized and if done at the receiver, circularly polarized light (which) passes through the retarder plate first) emerges linearly polarized at 45° to the original direction—it can then pass through the linear polarizer with just slight attenuation.

Rotation of either the transmitter or receiver quarter wave retarder by 90° from the position in which it serves to operate as an isolator also changes the state to non-isolating because the specularly reflected circularly polarized wave is then exactly aligned with the receiver polarizer as it emerges in the linearly polarized form from the receivers quarter wave retarder. Isolating and non-isolating states may also be achieved by various combinations of crossed and aligned linear polarizers, respectively.

OBJECT OF THE INVENTION

It is therefore an object of the present invention to provide an apparatus for detecting the presence of a depolarizing dielectric material, such as ice or snow, on a metal specular reflecting surface.

A further object is to provide a system for detecting ice and/or snow on the metal (or metallic painted) wing of an aircraft.

An additional object is to provide a system for detecting ice and/or snow on a metal (or metallic painted) surface which is specularly reflective to light using circularly or linearly polarized light.

Yet another object is to provide a system for detecting ice or snow on a metal or metallic painted surface in which optical means are used to produce an on-off light blinking response for a metal surface and a steady light response for any part of the surface covered with ice or snow.

Other objects and advantages of the present invention will become more apparent upon reference to the following specification and annexed drawings, in which:

BRIEF DESCRIPTION OF THE DRAWINGS

FIG. 3A is a schematic view of an ice detection apparatus based on direct visual observation using two spotlight illuminators, one polarized and one not;

FIG. 3B is a schematic view of an ice detection apparatus based on direct visual observation which uses one circularly polarized light source;

FIG. 3C is a detail of the FIG. 3B apparatus for switching the polarizer between isolating and non-isolating states in the detection path;

DETAILED DESCRIPTION OF THE INVENTION

Figure 1A:
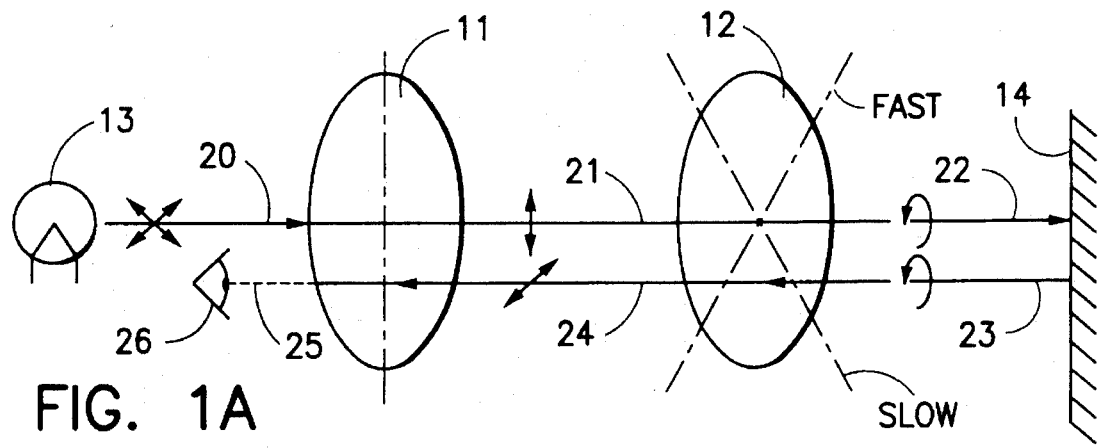
FIG. 1A is an optical schematic of a circular polarizer with the linear polarizer facing the illumination source so that the polarizer acts as an optical isolator.

FIG. 1A illustrates the operation of a circular polarizer used as an isolator. Light is emitted from an unpolarized source 13, which preferably is as close to monochromatic as possible. The light is shown as unpolarized by the arrows in two orthogonal directions along line 20, the path the light is following. The unpolarized light passes through a linear polarizer 11 which has a vertical polarization axis. The light passing through linear polarizer 11 takes path 21, along this path illustrated as vertical polarization by the double arrow.

The vertically polarized light at 21 passes through a quarter wave retarder plate 12. The retarder 12 is a plate made from birefringent material, such as mica or crystal quartz. Its purpose is to change linearly polarized light from polarizer 11 into circularly polarized light. Any ray incident normal to the retarder plate 12 can be thought of as two rays, one polarized parallel to the parent crystal's optic axis (e-ray) and the other perpendicular (o-ray). The e-ray and o-ray travel through the plate 12 at different speeds due to the different refractive indices. The plate 12 is said to have a "fast" and a "slow" axis.

The quarter wave retarder plate 12 has its slow and fast axes both at 45° relative to the vertical axis of the linear polarizer 11 so that the emerging circular polarized light from plate 12 along path 22 is rotating in a CCW direction as viewed facing the light source from a reflecting surface 14. A metallic surface, which is a specular reflector, and a dielectric surface, i.e., ice or snow, behave differently when illuminated with light, particularly with respect to their polarization properties. A strong and easily observable difference is the ability of a metal to reverse the rotational direction of incident circularly polarized light. The specular reflection of right-handed (CW) circularly polarized light from a metal surface changes into left-handed (CCW) polarization and vice versa.

This effect is used in the construction of optical isolators which permit light to initially pass through the isolator but prevent such light when specularly reflected from returning through the isolator back to the light source. When the optical isolator is a circular polarizer it is usually implemented from a linear polarizer and a quarter wave retarder plate that has its fast and slow axes located 45° from the polarization axis of the polarizer.

In FIG. 1A, surface 14, which is a specular surface, reflects the incident circular polarized light back along path 23. The reflected light continues to rotate as viewed from the surface 14 in the CCW direction but has now changed "hand", in terms of right hand and left hand, because it is rotating in the same direction with its direction of travel changed.

The reflected light on path 23 passes through the quarter wave retarder 12 and emerges no longer circularly polarized but linearly polarized in the horizontal direction, which is shown along ray path segment 24. Because the light ray 24 is horizontally polarized it is not passed by the (vertical) linear polarizer 11. Therefore, none of the specularly reflected light gets through to path segment 25 to enter the eye 26, which is shown near the location of the light source 13. Thus, the quarter wave retarder plate 12 acts as an optical isolator. That is, light from the source 13 is passed through the circular polarizer and reflected by the specular surface 14 but cannot pass through the circular polarizer back in the other direction and so is blocked before it gets to the eye.

Figure 1B:
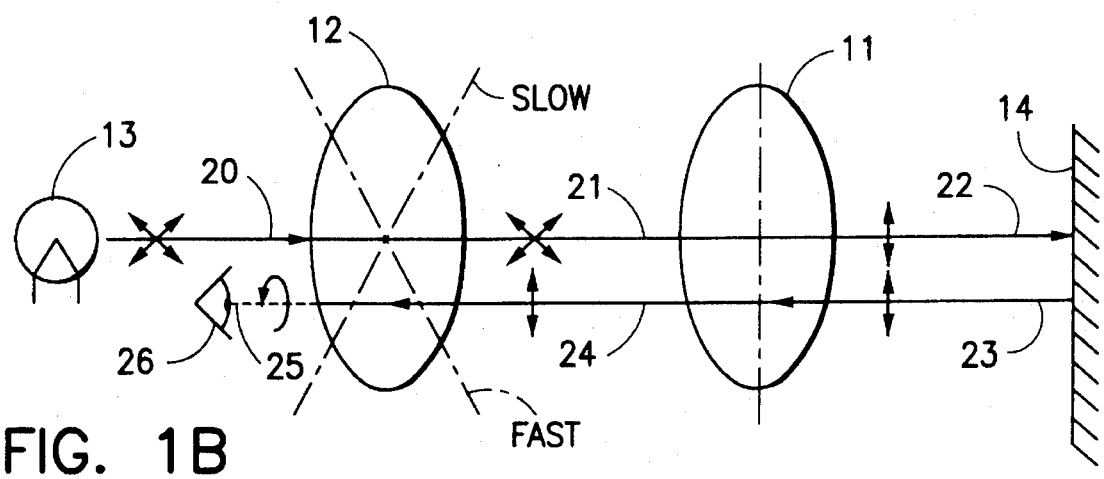
FIG. 1B is an optical schematic of a circular polarizer with the quarter wave plate facing the illumination source so that it passes specularly reflected light, i.e., it is a non-isolator.

FIG. 1B shows the same quarter wave plate and linear polarizer combination used but the sequence of the elements is reversed. Here, the quarter wave retarder plate 12 is facing the illumination source 13 and the linear polarizer 11 is facing the output side towards the reflecting surface 14. The light rays now emerge from source 13 in an unpolarized form along ray path 20 and pass through the quarter wave plate 12. However, because the light is not polarized the quarter wave plate 12 does not change any polarization properties. The light then passes through the linear polarizer 11 and becomes vertically polarized along ray path 22.

Surface 14 specularly reflects with the same polarization the vertically polarized light which travels along ray path 23 back towards the linear polarizer 11 with the same polarization. The light now enters the quarter wave retarder plate 12. Because the light entering plate 12 is polarized in the vertical direction, it emerges from the quarter wave plate circularly polarized. However, this is of no consequence to the eye 26, so the eye sees the light that has been reflected from the surface 14. Thus, in this case with the light first entering the quarter wave plate 12 and then passing through the linear polarizer 11 and being specularly reflected back to the eye through the linear polarizer and the quarter wave plate, there is little loss in the light intensity.

As can be seen in the comparison of FIGS. 1A and 1B, light from the same source 13 reflected from the specular reflection surface 14 is viewed by the eye 26 either dim or bright depending upon the location of the quarter wave retarder plate 12 relative to the linear polarizer 11. That is, FIG. 1A effectively is an optical isolator while FIG. 1B is a non-isolator.

Figure 2:
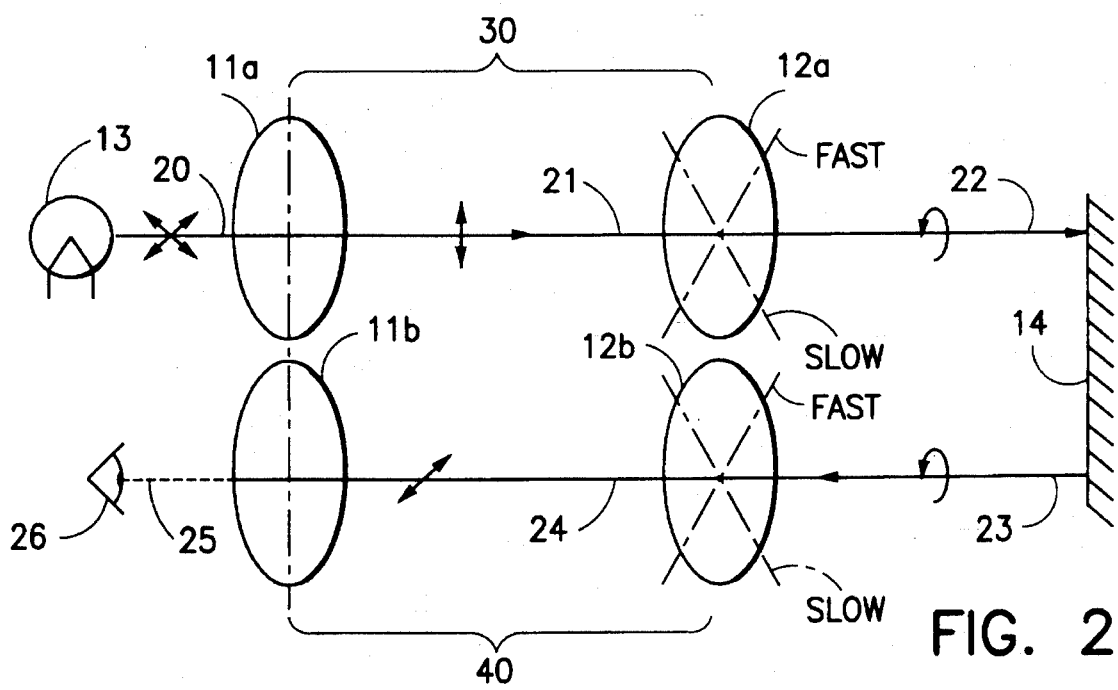
FIG. 2 is an optical schematic of two circular polarizers, one in the transmit path and one in the detection path, that together form an optical isolator.

FIG. 2 shows the same implementation of a circular polarizer as in FIG. 1A, with the receive path and the transmit path each having their own circular polarizers. Both circular polarizers are in the same order. That is, both linear polarizers 11a and 11b are on the left, one adjacent to the light source 13 and the other the eye 26, and both quarter wave retarders 12a, 12b are on the right adjacent to the reflective surface. Thus, as shown, the light from lamp 13 enters the linear polarizer 11a, exits vertically polarized, passes through the quarter wave plate 12a and emerges rotating CCW as viewed from the specular reflecting surface 14. The light reflects off the surface 14 still polarized rotating CCW as viewed from surface 14 and passes through the circular polarizer 12b in the return direction path to enter quarter wave plate 12b, from which it exits horizontally polarized to the vertical linear polarizer 11b which blocks the light. Linear polarizer 11b in the reception leg is distinct and separate from the linear (vertical) polarizer 11a that was used in the transmit leg. Because the polarization of the light ray along path 24 is horizontal, the light does not pass through the linear polarizer 11b and cannot enter the eye 26.

When a metallic surface, such as the wing of an air-craft, is illuminated with circularly polarized light produced by the device of FIG. 1A and the reflected energy viewed through the same circular polarizer the resulting image is extremely dim since the circular polarizer is performing as an isolator with respect to the specular reflection of the circularly polarized light (of opposite hand) from the metallic surface.

A painted portion (non-specular) of the surface illuminated with circularly polarized light does not reflect light in a polarized form. Instead, it destroys the circular polarization and makes the reflected light unpolarized. Thus, the unpolarized light reflected from a painted surface portion when viewed through the same circular polarizer of FIG. 1A will maintain its normal intensity. Time same holds true for circular polarized light reflected from a wing covered by ice or snow. However, other common harmless substances such as water or de-icing fluid that may be on the wing do not destroy the circular polarization of the reflected light.

As explained with respect to FIG. 1B, the components of the circular polarizer of FIG. 1A are flipped (rotated) such that the retarder plate 12 precedes the linear polarizer 11 with respect to the source of light 13, so it no longer acts as a circular polarizer to an illuminating beam. Accordingly, the reflection of circular polarized light from the metal surface will pass back to the eye and will be of normal (bright) intensity. The image intensity of such light reflected from a painted or dielectric (non-specular) surfaces also will be unchanged as in the previous case.

When a metallic surface is alternately illuminated and viewed by the isolator and non-isolator devices of FIGS. 1A and 1B, the return images at the eye 26 will alternate between dark and bright. A painted or dielectric non-specular surface will remain uniformly bright to the alternation since the light reflected from the painted or dielectric surface is not polarized and will not be isolated.

Assuming that a metallic surface has a patch of ice thereon or is coated with ice, the ice being either matte white due to snow covering or crystal clear due to rapid even freezing, this will destroy the circular polarization of the reflected light and therefore take on the property of a matte painted surface with respect to the optical isolator. That is, referring to FIG. 1A, if there is ice on any portion of the specular surface 14, then the circularly polarized light 14 impinging upon such portion of the surface will not have its polarization reversed. Instead, it will have the effect of a painted surface so that the returned light will be non-polarized and will pass to the eye, i.e., the returned image will be bright.

Accordingly, upon alternately illuminating and viewing an ice-free metallic surface 14 with the circular polarizer-isolator of FIG. 1A and the non-isolator of FIG. 1B, the return viewed by the eye 26 will alternate between dark and bright respectively. Any ice or snow covering a portion of the metal surface 14 will cause that portion of the image to maintain the same brightness regardless of whether it is viewed through an isolator or non-isolator structure upon such alternate illumination and viewing.

Switching between an isolator structure, e.g., FIG. 1A, and non-isolator structure, e.g., FIG. 1B, may be implemented by switching the light illuminating the metallic surface between circularly polarized and non-circularly polarized light while observing through a circular polarizing filter of the same hand, i.e., CW or CCW, as required to complete the isolator. As an alternative, the light illuminating the metallic surface may be kept circularly polarized but viewed alternately through a circular polarizer of the same hand and a non-circular polarizing element having the same optical attenuation. This is most easily accomplished by viewing through the same type of circular polarizer flipped over (reflected light enters the polarizer element first) to keep it from acting as the circular to linear polarizing element of an isolator while simultaneously maintaining the slight light attenuation of its elements.

Another arrangement is to maintain the illumination in a circular polarized state. Thereafter, the surface would alternately be viewed through right-handed and left-handed circular polarizers which alternately change between the isolating and non-isolating states.

A non-isolating state also may be achieved by rotating either the receiver or transmitter quarter wave retarder plate 12 by 45°. This aligns the slow or fast axis of the retarder with its polarizer. The net effect is that, if done at the transmitter, linearly polarized light passing through the quarter wave plate remains linearly polarized. If done at the receiver, circularly polarized light (which passes through the retarder plate first) emerges linearly polarized at 45° to the original direction. It can then pass through the linear polarizer to be viewed with just slight attenuation.

Rotating either the transmitter or receiver quarter wave retarder by 90° from the position in which it serves to operate as an isolator also changes the state to non-isolating because the specularly reflected circularly polarized wave is then exactly aligned with the receiver polarizer as it emerges in linearly polarized form from the receiver's quarter wave retarder.

The following table illustrates the implementation that may be used when alternating either the illumination (transmitter) or receiver (detector) polarizing elements or vice versa to change the overall path from an isolator to a non-isolator structure:

| Between Transmitter and Surface (or Surface and Receiver) | Between Surface and Receiver (or Transmitter and Surface) |
| --- | --- |
| CW only | [CW, LP] [CW, UP] [CW, CCW] |
| CW, LP | CW |
| CW, UP | CW |
| CW, CCW | CW or CCW |
| LP LP, UP | LP+, LP− LP |

In the table above the following abbreviations are used;
CW    Clockwise polarization - (Right handed)
CCW   Counter Clockwise polarization - (Left handed)
LP    Linear polarization
LP+   Linear polarizer aligned with LP
LP−   Linear polarizer at blocking angle (e.g. 90°) to LP
UP    Unpolarized
Alternating states are separated by commas. Equivalent sets of alternating states are isolated by square brackets. In any row CW and CCW may be interchanged. In any row CW may be replaced by RH (right hand) and CCW by LH (left hand). (The columns can be interchanged), i.e., the action can be either on the transmitter or receiver leg.

The table shows that when using linear polarization, the isolating state refers to the receiving polarizer being orthogonal to the polarization of the transmitted energy beam, and the non-isolating state refers to any of the following conditions: (a) non-polarized transmission; (b) no polarizer in the receiver path; or (c) the polarizer in the receiver path is approximately aligned with the polarization of the transmitted beam.

FIG. 3A is a schematic view of a monocular version of an ice detection system suitable for night use based on direct visual observation. The direct visual observation receiver uses a non-inverting telescope 50 with a circular polarizer 40, like the circular polarizer of FIG. 1A, at its entrance. Two spotlights 13a, 13b are used for the source of illumination, i.e., the transmitter. One spotlight 13a has a circular polarizer 30 isolator, like FIG. 1A, mounted to it. The other spotlight 13b has a neutral density filter 30a or a "same hand" circularly polarized filter mounted backwards so that the light coming through is linearly and not circularly polarized, i.e., like the non-isolator of FIG. 1B.

The two spotlights 13a, 13b illuminate a common overlapping area of a surface shown as the entire area or a portion of an aircraft wing 15 having a patch 16 of ice thereon. The clear (no ice) portions of the wing 15 form a specular reflecting surface such as the surface 14 of FIGS. 1A and 1B. The wing 15 is observed by the field of view 23 of the non-inverting telescope 50. Both spotlights 13a, 13b and the non-inverting telescope 50 are mounted on a support structure 52, which in turn is mounted to a tripod or boom 54. A power supply and sequencer 51 for the lights 13a, 13b is also located on the tripod boom structure. Two outputs from the sequencer 51 are taken along wires 53a and 53b to connect with and alternately energize the lamps 13a and 13b, respectively.

The eye 26 is shown looking through the telescope 50. The field of view of the upper spotlight 13a is shown as 22a and that of the lower spotlight 13b as 22b. The region observed by the non-inverting telescope 50 is formed from the fan of rays 23 reflected back from wing 15 into the telescope 50.

In operation, the sequencer 51 alternates between sending a voltage to and alternately energizing spotlight 13a and then spotlight 13b during corresponding time periods "a" and "b". When the voltage is applied to spotlight 13a the outgoing light is circularly polarized by polarizer 30 and the light emerges in fan 22a which illuminates the aircraft wing surface 15. The light from fan 22a reflected from the aircraft wing 15 passes back through fan 23 into the circular polarizer 40 of non-inverting telescope 50 where it may be viewed by the eye 26 during the interval "a". During the period "a" an optical isolator arrangement is in place because there are two circular polarizers 30 and 40 in the path. This is shown in FIG. 2. That is, metal areas of the wing which produce a specular mirror like reflection reverse the "hand" of the incident circularly polarized light and prevent it from passing back through the isolator. Therefore, the eye 26 sees a very dark region covering the aircraft wing, except where there is ice, which is shown on area 16 of the aircraft wing and which area will show brighter to the eye through the telescope.

When spotlight 13a is turned off and spotlight 13b is turned on during period "b", the light emerging from spotlight 13b is not circularly polarized. Now the reflection coming back to telescope 50 from both the areas with ice or a metal area without ice will approximately maintain their normal brightness. Thus as the sequencer 51 alternately energizes the spotlights 13a and 13b, the image at the eye 26 from any area that is metal, specular and ice free will appear to blink on and off. This will be "on" (bright) when the optical isolator is not in operation and "off" (dark) when isolation exists. However, areas that have ice will not blink and will have essentially constant brightness, because the polarized light produced during period "a" is depolarized upon impinging and being reflected from the ice or the metal under the ice.

FIG. 3B shows another ice detection apparatus especially suitable for night use, which is based on direct visual observation and uses only one spotlight 13 with a circular polarizer 30, such as FIG. 1A. In FIG. 3B the receiver telescope 50 has apparatus at its input for changing a circular polarizer between the isolating (FIG. 1A) and non-isolating (FIG. 1B) states. Here, the illumination source 13 and the telescope 50 are mounted on a bracket 52 of a boom mount or tripod 68. A power supply 67 for lamp 13 also is mounted on the boom.

Power supply 67 supplies the power to lamp 13 along cable 66b. Lamp 13 incorporates a circular polarizer 30, such as of FIG. 1A. The field illuminated by lamp 13 is shown as 22a and encompasses an aircraft wing area 15 which has an area of ice 16. Telescope 50 has a field of view encompassing the aircraft wing, or portion of the wing, and this is shown in the ray fan 23 which enters the telescope. Telescope 50 alternates between optical isolation and non-isolation to the reflected light using a circular polarizer made of a fixed linear polarizer 41 and quarter wave retarder plate 42. As shown in FIG. 3C, the quarter wave retarder plate 42 is rotated about its optical axis by drive 65.

FIG. 3C is a detail showing the apparatus for rotating the quarter wave retarder plate 42. The quarter wave retarder plate is rim driven by friction drive 65 attached to a motor shaft 64 driven by a motor 63 which itself is attached to telescope housing 61. Bearings 62 between the quarter wave retarder plate 42 and the housing 61 relieve friction so that the quarter wave retarder plate may freely rotate about its optical axis. When the quarter wave plate has rotated to such a position that its slow and fast axes are at 45° to the vertical, as shown in FIG. 2, the unit acts as an optical isolator and any circularly polarized light that is specularly reflected from the aircraft wing cannot pass through the combination of the quarter wave retarder and the linear polarizer to the eye 26.

A similar end may be achieved by rotating the linear polarizer 41 via rim drive 60 and keeping the quarter wave retarder plate 42 fixed or by keeping both linear polarizer 41 and quarter wave retarder plate 42 fixed and rotating a half wave plate mounted between them with rim drive 60.

The position for optical isolation is achieved twice during two positions spaced 180° apart of each revolution of the quarter wave retarder 42. At any other position of rotation of plate 42, there is no isolation and the circularly polarized light reflected from the various portions of the wing, both metal and ice, is free to pass through to the eye with only minimal attenuation. Therefore, the specularly reflective metal portion of the wing that is not covered with ice will reflect light from the illuminator 13, circularly polarized, back through the isolating mechanism 41, 42a and this specularly reflected light will be interrupted twice per revolution and blink off completely. During the other positions of the circular polarizer retarder plate 42 rotation the light will pass through to the eye 26. Thus, the "on"-"off" blinking effect will be produced twice for each rotation of plate 42.

On the areas of the wing 15 when there is ice present, the incident circularly polarized light from lamp 13 and polarizer 30 will be depolarized due to the surface of the ice or by passing through the ice. This depolarized light will pass through the isolator 41, 42a at the telescope 50 regardless of the rotational position of the quarter wave retarder plate 42. That is, even when the plate 42 is in one of its two isolating positions relative to reflected polarized light, the non-polarized light reflected from the ice will pass through to the telescope as well as when the retarder plate is in a non-isolating position.

The eye 26, which is looking through the telescope 50, is able to differentiate between the blinking effect produced by the ice free section of the wing 15 and the non-blinking effect produced by sections 16 of the wing with ice. That is, the sections of the wing covered with ice 16 will appear to have constant illumination and the ice free sections of the wing will appear to blink at a rate of twice the speed of rotation of the quarter wave plate 42.

In either of the embodiments of FIGS. 3A and 3B, the apparatus can be moved to scan all parts of the wing if the field of view is not large enough.

Figure 4A:
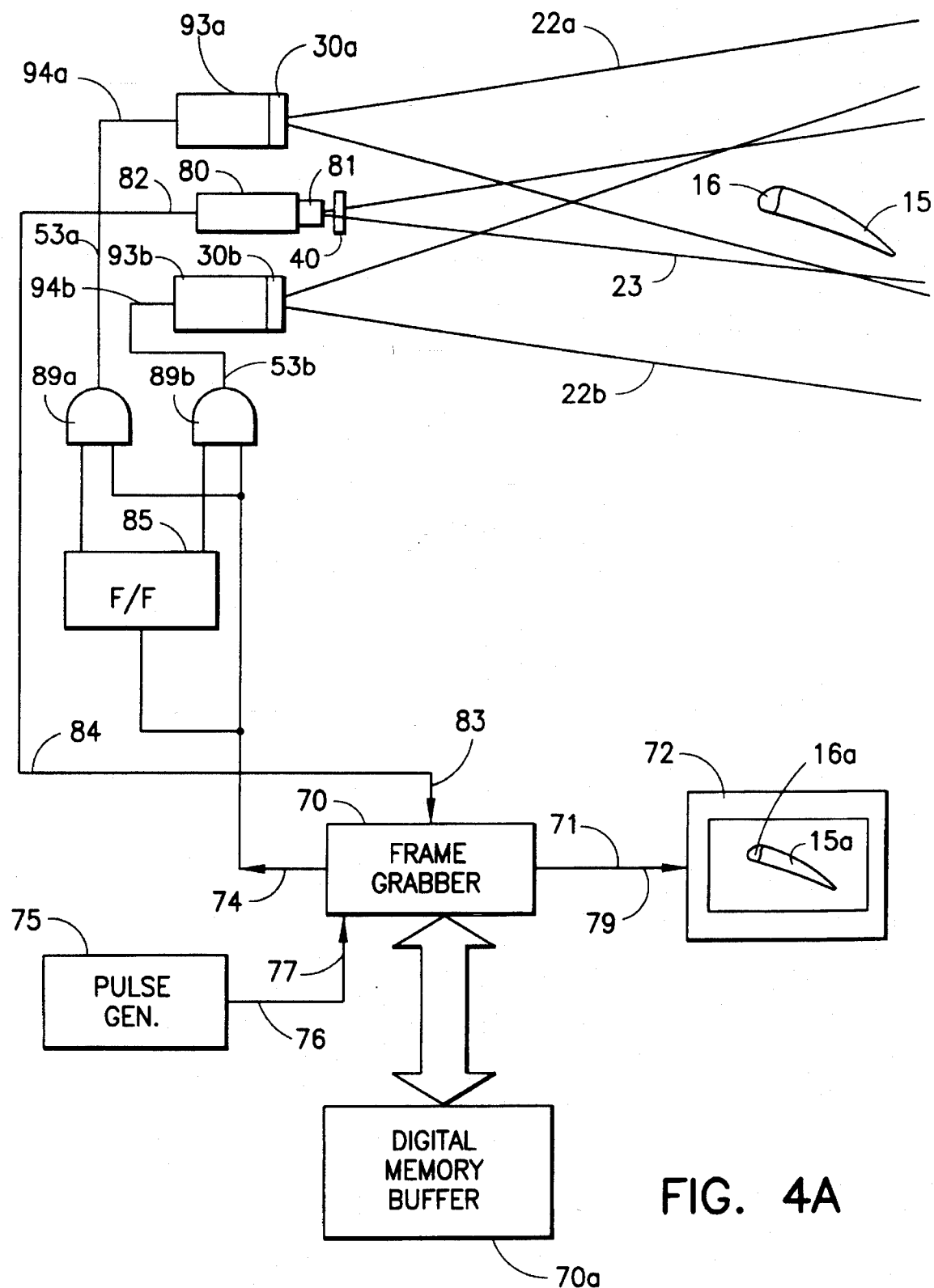
FIG. 4A is a schematic diagram of a video based ice detection system suitable for use with high background illumination levels which employs two strobed light sources.

FIG. 4A shows an indirect viewing video-based ice detecting system that employs two strobe lamp spotlights and is suitable for use with high background illumination levels.

The system of FIG. 4A is similar to that of FIG. 3A in that it employs two strobe lamps 93a, 93b. These lamps are of the type which produce a high intensity output, for example a xenon lamp, for a short time period. Here, both strobe lamp 93a and 93b have circular polarizers, such as in FIG. 1A, attached. One is a right handed circular polarizer 30a and the other a left handed circular polarizer 30b. The strobe lamps 93a and 93b are used in conjunction with a conventional video camera 80 with a lens 81 having a right handed circular polarizer 40 at its input.

The analog signals of the image produced by the video camera, which observes the scene illuminated by the strobe lamps 93a, 93b, are sent to a conventional frame grabber 70. The frame grabber 70 converts the analog video signal from camera 80 to digital form and stores them in a digital memory buffer 70a. Pulse generator 75 is used to initiate the strobing of the lights and the grabbing of a single isolated frame by the frame grabber from the video camera.

The system also preferably has a digital to analog converter and sync generator so that the image stored in the buffer 72a can be sent from the frame grabber video output to a video monitor and/or VCR 72 along cable 71. The video monitor and the video cassette recorder (VCR) are commercially available. As an alternative, the video monitor may have a disk recorder which is also commercially available. The frame grabber may be purchased with additional memory attached and a computer as part of one single image processor unit. This portion is shown as 70A. Frame grabber 70 and its memory, plus computer CPU 90A may be bought commercially as the Cognex 4400.

A flip flop 85 alternates between states on every strobe pulse produced by pulse generator 75. This allows selectively gating a strobe pulse to either lamp 93a or 93b so that they are illuminated alternately. When a pulse trigger input is received by the frame grabber 70 from pulse generator 75 output 76, a camera synchronized strobe pulse is generated which is fed from the frame grabber output 74 to the flip flop 85. The strobe pulse toggles flip flop 85 and is also gated through one of two AND gates 89a and 89b. When the flip flop 85 is in one state the strobe out of the frame grabber is gated through AND gate 94a to the input 94a of strobe lamp 93a. When flip flop 85 is in its other state, a pulse is sent along wire 53b to input 94b of strobe lamp 93b. Thus, lamps 93a and 93b are alternately illuminated.

The field of view from the strobe lamp 93a with right hand circular polarizer 30a is shown as 22a. The illumination area from strobe lamp 93b with left handed circular polarizer 30b is shown as 22b. The video camera 80 has a field of view 23 that covers the overlapping region between 22a and 22b. In the video camera field of view 23 are the wing 15 with iced area 16. The images that correspond to wing 15 and iced area 16 that are shown on the video monitor 72 are labeled correspondingly as 15a and 16a.

During operation, the pulse generator 75 is set to provide trigger signals at a constant rate, e.g., in a range between 1 and 10 Hz. When a trigger signal enters the frame grabber input 77, it is synchronized with the frame grabber internal cycle and at the proper time the frame grabber provides a strobe to flip flop 85 which is passed on to strobe lamps 93a or 93b. The strobe output is timed to be properly aligned with the frame synchronization signal that is sent along cable 84 from frame grabber output 83 into the video camera 82. Cable 84 provides a path from the frame grabber 70 to the video camera 82 for synchronization and a return path from video camera output 82 to frame grabber for the video signal.

If the pulse received by the AND gate 89a is enabled because flip flop output 85 is high, the strobe will pass through AND gate 89a, enter the strobe input 94a and fire the strobe lamp 93a. The strobe lamp will produce a very short light pulse of approximately 10 microseconds length. The light pulse from the strobe lamp 93a illuminates the wing area. The reflected light from ice free specular area of the wing will be left hand circularly polarized because of the right hand circular polarizer 30 at the output of strobe lamp 93a. Because the video camera 82 has a right hand circular polarizer 40 at its input, it acts as part of an isolator. That is, any reflection from a clean metal specular area of the wing will reflect left hand polarized light which will not be able to get through the right hand circular polarizer 40 of the camera 80 and thus these areas as viewed by the camera will be very dark. The image sent by the video camera to the frame grabber will also appear very dark as well as the stored image that is sent from the frame grabber buffer memory into the video monitor 72 input 79 via wire 71.

Where there is ice present on the wing it will spoil the circular polarization of the polarized incident light and the image scene of the reflective light picked up by camera 80 and viewed on monitor 72 will not be dimmed.

When the strobe signal passes through AND gate 89a, it simultaneously resets flip flop 85 to the opposite state such that AND gate 89b is enabled. Therefore, the next pulse from the pulse generator 75 into the frame grabber 70 causes the corresponding strobe pulse to be generated which will be gated through AND gate 89b to energize strobe lamp 93b whose light output is left hand polarized. Energy from strobe lamp 93b that strikes the wing 15 and returns from clean metal will be sent into the right hand polarizer 40 of the video camera 80. However, in this case, because the polarizations are of opposite hand, the reflected light energy that enters from specular reflecting portions of the wing 15 will pass through right hand polarizer 40 and into video camera 80 via lens 81 with only minor attenuation. That is, light from the left handed circularly polarized source 93b, 30b is changed to right landed circular polarization upon specular reflection from wing 15 and this light may pass freely through the video camera's right hand circular polarizer 40.

The corresponding analog signal from the video camera that is sent to the frame grabber 70 is recorded in its frame memory buffer and is output along line 71 to the video monitor 80. This particular signal will create an image that has little difference in light intensity between a specular area or an ice covered area. Polarization in this case is not important since the specularly reflected left handed circularly polarized light will pass through the video camera's right handed polarized filter 40. Thus, specular reflected returns and also the returns that come from paint or ice covered surfaces will pass equally well. Accordingly, the blinking effect will be produced for the area of a metallic surface which does not have ice on it.

Video camera 80 is preferably of the type with a built in electronic shutter such as the Hitachi KP-M1. Because the camera shutter can be set for a very brief time interval that corresponds to the time interval of the strobe lamp illumination, the camera will be especially sensitive to the bright light from the strobe lamps and very insensitive to background light which will be not be at a peak during the brief open shutter interval and will ignore all background light outside of the interval that the shutter is open.

Figure 4B:
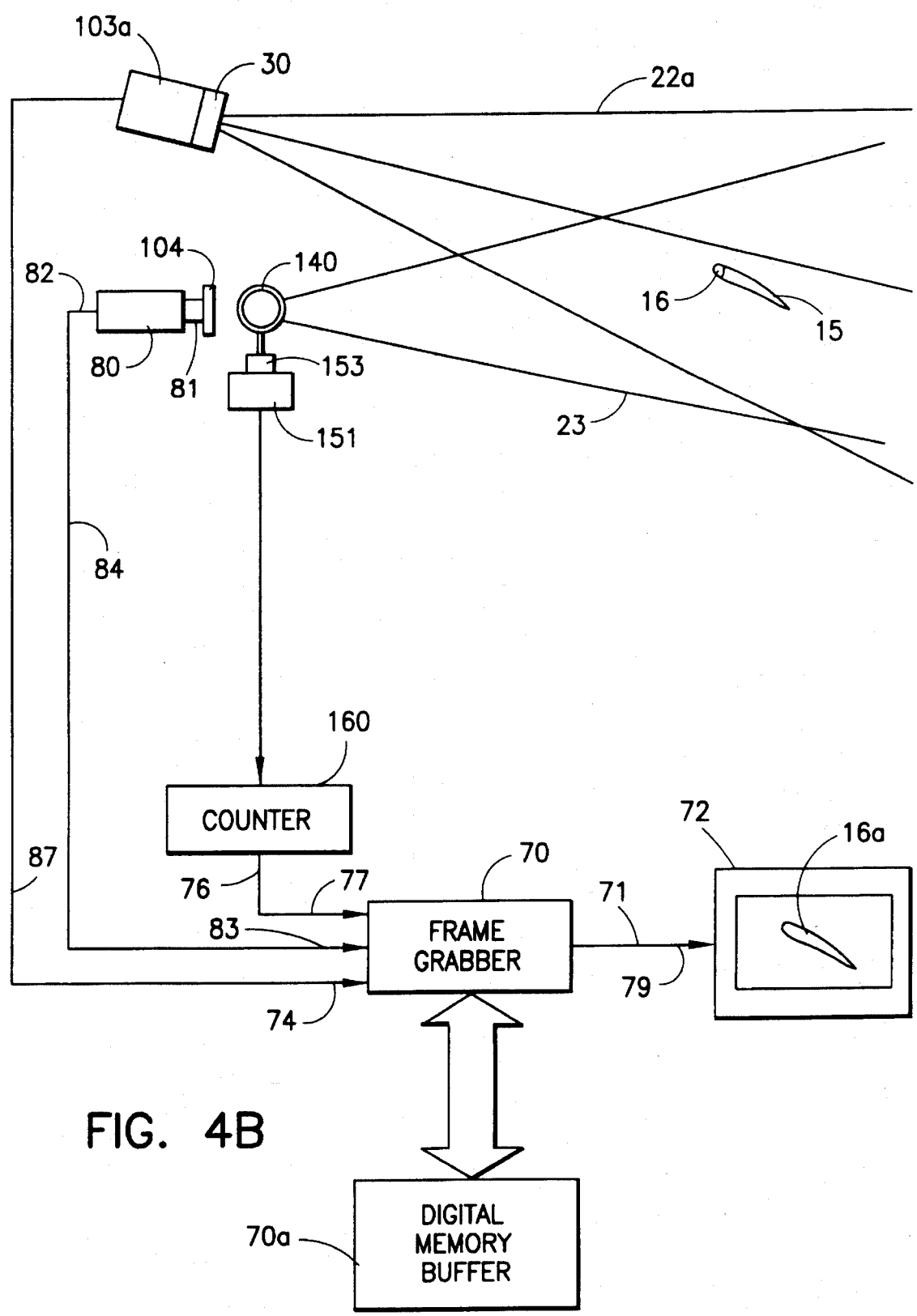
FIG. 4B is a schematic diagram of a video based ice detecting system employing one laser based strobed light source suitable for use with high background illumination levels.

FIG. 4B shows an indirectly viewed video based ice detecting system employing one strobed laser spotlight that makes it suitable for use with high background illumination levels. In FIG. 4B a strobe lamp 103a is a pulsed laser which typically has an output at a wavelength in the region of about 800 nanometers. Light from laser strobe lamp 103a is sent through a right land circular polarizer 30 and covers the field of view 22a. The light from a laser is often naturally linearly polarized without using a linear polarizer and in such a case it may be circularly polarized using just a properly oriented quarter wave retarder plate 12. The right hand polarizer 30 must be rotated to the proper position so that its self-contained linear polarizer is in line with the polarization of the laser lamp output in the case that the laser light is naturally linearly polarized.

Video camera 80 views the scene via a narrow band interference filter 104 which is centered about the laser 103a output wavelength. Generally, such a filter will have a bandpass of approximately 10 nanometers and reject all light outside of the bandpass wavelength.

Reflected polarized light from the specular reflecting part of wing 15 entering the video camera 80 also passes through a rotating right hand circular polarizer 140 placed in front of the video camera lens 81. The rotating right hand polarizer 140 is driven by a motor 151. A signal from an encoder 153 attached to a motor 151 is sent only when the rotating right hand circular polarizer 140 has its plane parallel to the lenses 81 at the video camera input so that the optical axes of such lenses and of the polarizer are in alignment.

The analog video signal from the video camera is sent to frame grabber 70 input 83 via cable 84 and on the same cable the frame grabber synchronizing outputs are sent to the video camera input 82. A monitor plus VCR (optional) 72 is connected to the frame grabber video output via cable 71. The image of the wing 15a and the image of ice area 16a on monitor 72 corresponds to wing 15 and ice area 16 which are in the field of view of both the illumination patterns 22a from laser strobe lamp 103a and camera field of view 23.

In operation of polarizer 140, synchronous motor 151 rotates the right hand circular polarizer 140 in front of the video camera 80 at a high rate of approximately 600 RPM. The plane of the right handed circular polarizer 40 lines up with the lens plane of the video camera lens 81 twice per revolution. Thus, there are 1200 times per minute that a picture may be taken. The output from an encoder on the rotating shaft of polarizer 140 is used to identify each time that the rotating polarizer passes through such an aligned position. The two positions per rotation are alternately isolating and non-isolating and correspond to the FIG. 1A and FIG. 1B illustrations of the isolating and non-isolating modes achieved by turning one of the circular polarizers.

The synchronizing pulses from the shaft encoder are sent to a programmable binary counter 160 which can be set to divide by any desired number. The output pulses from the binary counter are sent to the trigger input 77 of the frame grabber 70 along wire 73. A typical counter divides by any integer between 1 and 16. Counter 160 allows the rate at which pictures are taken to be adjusted from a very rapid rate to a slow rate. For example, the rate at which pictures will be taken when the divider is set to 16 will be 1200 pictures per minute divided by 16. To insure that alternating isolating and non-isolating states are obtained it is necessary to use only odd numbers as the divisor.

In both cases of FIGS. 4A and 4B electronic circuits are preferably used to gate the video camera 80 to accept light only during the active interval of the strobe light. Also, in both cases optical bandpass filters may be used in front of the camera to match the strobe lamp's peak wavelength while simultaneously blocking out most of the wavelengths associated with ambient lighting. The typical strobe light, a xenon flash tube, produces a 10 microsecond flash which may be synchronized to the 1/10,000 second shutter of a commercial CCD video camera. Since the unshuttered camera would normally integrate ambient light for at least one field, or 16 milliseconds, there is an improvement factor of 160:1—the effect of ambient sunlight can be reduced by 160:1. This 160:1 factor can be further improved by matching the strobe lamp (or pulse laser source) with a filter that cuts down the ambient wide band light by a much greater amount than the illumination source.

In both the systems of FIGS. 4A and 4B the video from the video camera is captured in a frame grabber and displayed on a video monitor. Thus, if the system alternates between the isolator and non-isolator state at a 2.22 Hz rate (division=9) the picture on the monitor will be updated every 0.45 second and the human observer watching the monitor will see the ice free metallic surfaces blink between dark and bright at the 2.22 Hz rate.

The embodiment of FIGS. 4A and 4B effectively add an image processing computer which performs arithmetic operations on individual pixels in multiple frame stores; one frame store per captured picture. The ability to perform operations on pixels allows working with portions of the image that are of low intensity and also provides further means for eliminating the deleterious effects of undesirable background illumination such as sunlight.

Even if a curved aircraft surface region is illuminated by multiple illumination sources of circularly polarized light, it will be found that due to the varied orientations of the surface normal with respect to the illumination sources and receiver there will be bright regions and dim regions in the image of the aircraft surface. The bright regions will correspond to those areas where the surface normal has the proper orientation to directly reflect the light from at least one of the illumination sources into the camera lens. The dim regions correspond to those areas of the aircraft surface where the surface normal is such that the light from the illuminators is reflected predominantly away from the camera lens. As previously described, portions of the image that correspond to an ice free surface and are brightly lit will tend to vary between white and black in successive pictures on the monitors of the FIG. 4A and 4B apparatus. However, portions of the aircraft surface that are ice free but in a dim region will vary between very dark gray and black in successive pictures and so may be difficult to identify. This problem will exist both because of the limited dynamic range of the monitor and camera and because the ratio of dark to light is intrinsically less for off axis returns. Any remaining background due to sunlight further reduces the apparent brightness ratio between ice free regions of successive images, particularly in the dim regions, by adding unwanted illumination to the images taken in both the isolating and non-isolating mode.

An optimum use of the equipment of FIG. 4A and 4B is to first capture an image in the frame store that corresponds to strobing the illuminator but blocking the light from specular reflection from ice free metal; i.e., capture a picture in the isolator mode. Next, the illuminator is strobed and a picture is captured in the non-isolating mode. Finally, a picture is captured with the illuminator strobe off; this captures a picture that consists purely of the undesirable background light. If the receiver (detector) optics is being varied between pictures to change between the isolating and non-isolating mode of operation, it is not important which mode it is in when the background image is captured because both modes will have been balanced for equal light attenuation of unpolarized light.

The digital value corresponding to the background illumination in each pixel of the frame grabber holding the background may now be subtracted from each corresponding value in each of the pixels of the image in which specular returns were blocked; i.e., from each pixel of the image taken in the isolating mode. The process of subtracting the background is repeated for each pixel in the frame grabber holding the image taken in the non-isolating mode. At this point, assuming linearity of the pixel values, the effect of any remaining background light has been removed from the two frame stores. If the recording or digitizing process is not completely linear the non-linearity must be removed before performing the subtraction. This is normally performed at the time the image is first digitized and entered into the frame store via the use of a look up table in the image processor and is well known in the state of the art.

Once the images in the frame grabbers have had the effects of background illumination removed the image processor can find the ratio of amplitudes between corresponding pixels in the two images. By forming a ratio of the value of the intensity of the pixels in the second (non-isolating) divided by the value of the intensity of the corresponding pixels in the first (isolating) a ratio having values generally equal to one or greater than one will be obtained. Ice free metallic surfaces that have surface normals reflecting the illumination towards the camera lens will have the highest ratios. A normalizing value approximately equal to the Nth root of one divided by the largest of the two pixel values that created the ratio (generally, the value of the pixel from the non-isolating picture) may be used as a multiplier to relatively enhance the ratio from the ice free surfaces that are dim due to their being off-axis with respect to directing the reflected light towards the camera. N is typically an integer equal to or greater than 2. Of course, only values higher than some chosen threshold should be so normalized so that the system does not respond to noisy signals. If desired, the preceding arithmetic manipulation of pixel values may instead be performed on groups of pixels that correspond to segmented and/or filtered portions of the aircraft surface image. These filtering techniques which include low pass spatial filtering and median filtering may be used to operate on noisy images and are well known in the state of the art. Another suitable metric for comparing corresponding isolating and non-isolating pixel or region brightness amplitudes is the normalized difference. This may be formed by subtracting corresponding pixel or region amplitudes and dividing the result by the sum of their amplitudes.

To highlight ice free regions in the most easily interpreted form, the ratios may be assigned to colors as, for example, that high ratios are assigned to the color green, low ratios to the color red, and intermediate regions with the color yellow. These colors may be used to color the non-isolator image on the screen of the color video monitor. Optionally, the ratios may be encoded in black to white intensity levels that may be displayed in the same manner as the color encoded images. Such levels may be used to indicate ice thickness according to the amount of depolarization observed.

All of the preceding techniques of using isolator and non-isolator structures may be implemented by using linearly polarized light in the illuminator, rather than circular, and equipping the receiver (detector) with a linear polarizer that is alternately aligned with and then at right angles to the polarizer in the illuminator. This mode of operation depends upon the fact that an ice-free metallic surface will return polarized light approximately unchanged whereas an ice covered metal surface or matte material will de-polarize the light. Thus, once again, an ice covered metallic surface will remain at approximately the same intensity. Of course, the transmitted linear polarization can be alternated between being aligned with and then being at right angles to the direction of a linear polarizer in the receiver to achieve the same end.

Figure 5A:
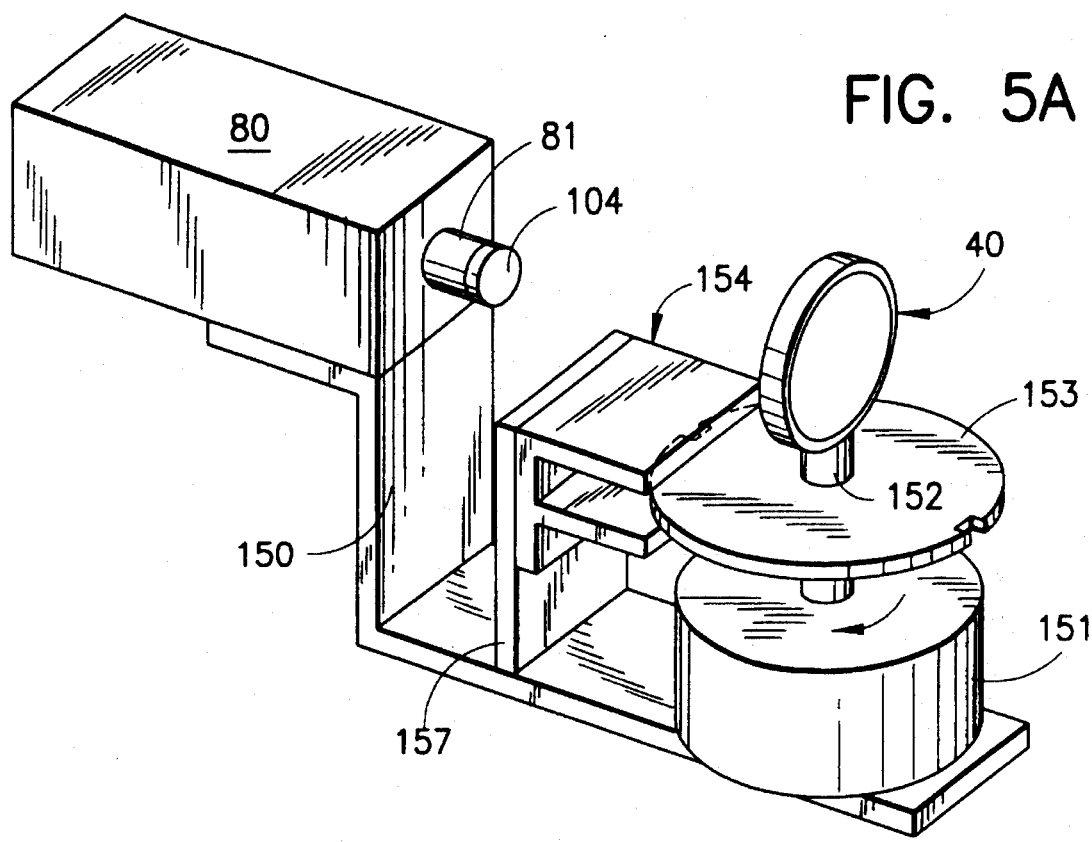
FIG. 5A is a schematic view of the device used in FIG. 4B to switch the polarizer from an isolating to a non-isolating state in the detection path.

FIG. 5A shows the details of the FIG. 4B rotating circular polarizer 40 and video camera 80 assembly. Video camera 80 is mounted to a bracket 150. A motor 151 is also mounted to bracket 150 and has a slotted output shaft 152 for holding the circular polarizer 40 to rotate in synchronism with the shaft. An encoder disk 153 mounted on shaft 15 is used to sense the position of the rotating polarizer 140. Encoder disk 153 has a photo optical interrupter 154 supported by a member 157 affixed to bracket 150. The encoder disk is solid everywhere except for two positions, 180° opposite, which are in line with photo interrupter 154 only when the optical plane of polarizer 140 is parallel to that of the lenses in video camera lens assembly 81.

Figure 5B:
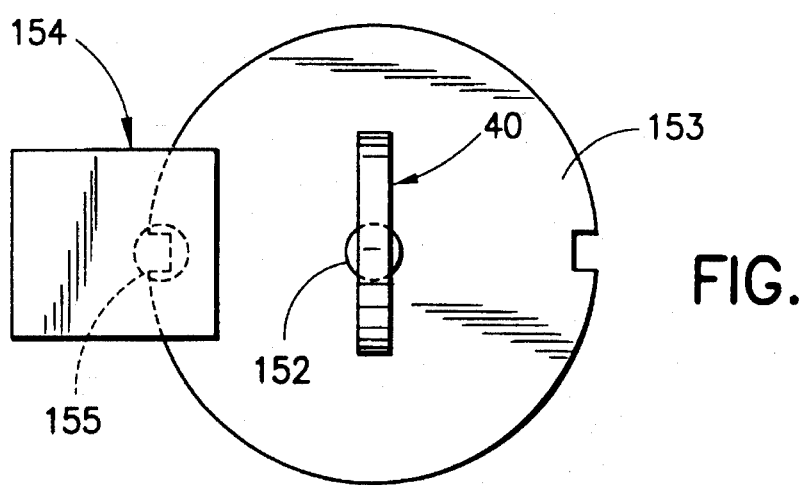
FIG. 5B is a plan view of the motor, polarizer and encoder assembly used with the apparatus of FIG. 5A.
Figure 5C:
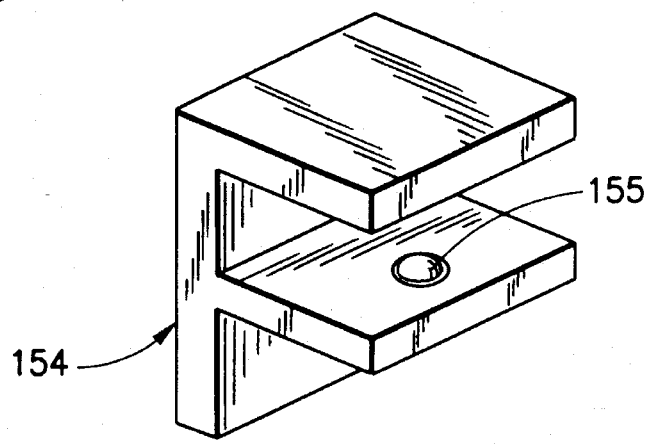
FIG. 5C is a schematic view of the photo interrupter device used in the encoder assembly of FIG. 5B.

A top view of this arrangement is shown in FIG. 5B and FIG. 5C which shows an encoder pickup 154 which incorporates an LED light source and a photo diode in one package that is commercially available as Optek part number OPB120A6.

Figure 6:
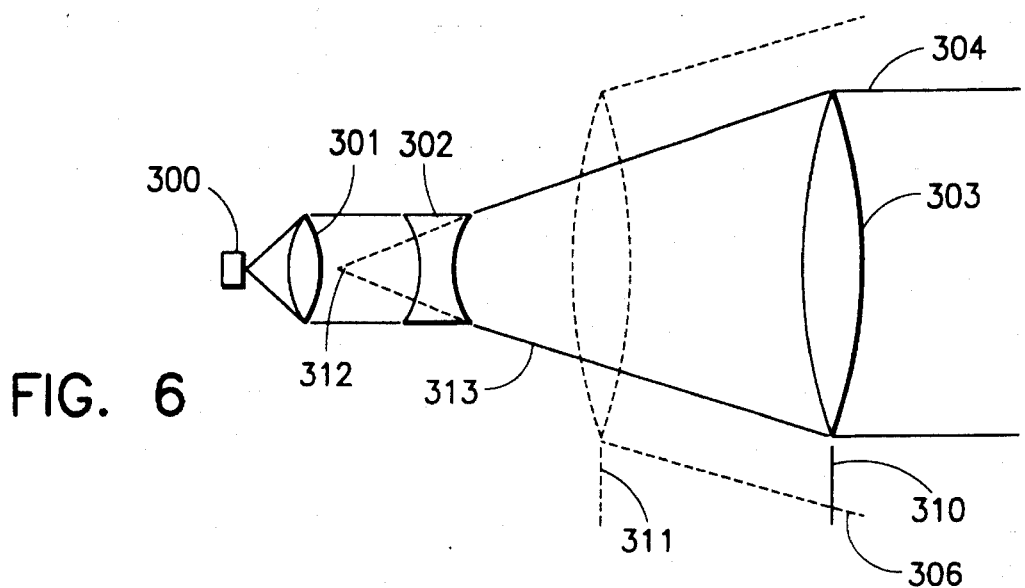
FIG. 6 is an optical schematic diagram of the laser light source of the system of FIG. 4B.

FIG. 6 is an optical schematic of the laser diode spotlight assembly. Light from laser diode 300 is collected by a collimating lens 301 and the collimated beam is sent into the telescope formed by a negative lens 302 and a positive lens 303. When the focal point of the positive lens is coincident with that of the negative lens, a collimated beam emerges from the positive lens 303. Positive lens 303 is shown in position 310 so that its focal point coincides at 312 with that of negative lens 302. A collimated beam 304 is the result of this configuration. When the positive lens 303 is moved closer to the negative lens, such as to position 311 in FIG. 6, the beam 306 that emerges is expanding and so can cover a wider field of view. Thus, by adjusting the position of the lens from 310 to a point where it is close to the negative lens, it is possible to obtain any output light cone between collimation and a cone slightly narrower in angle than that of the beam 313 as it leaves negative lens 302. The arrangement of FIG. 6 is also applicable to all other illumination sources shown when the source (filament or flash lamp) is small.

Figure 7:
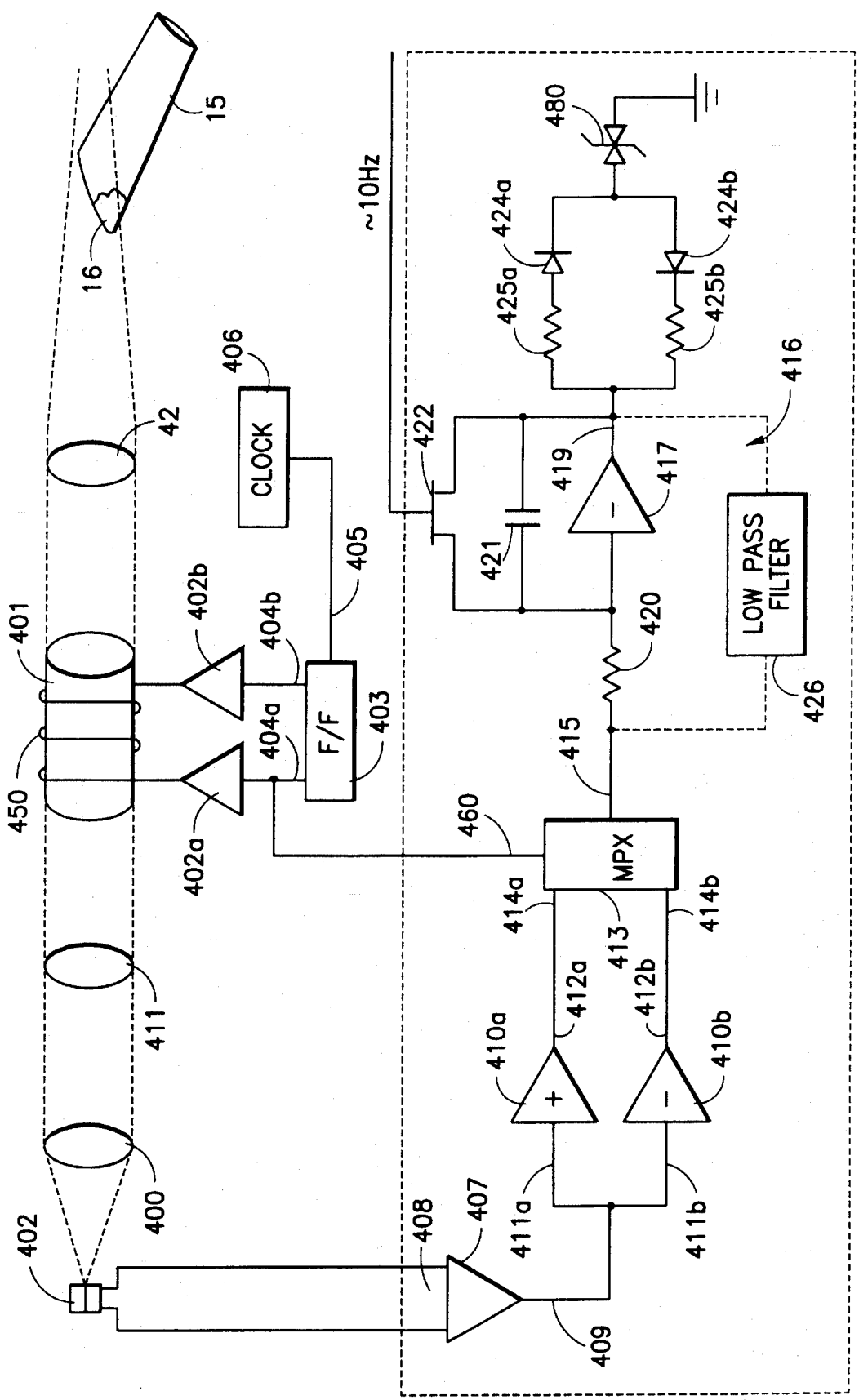
FIG. 7 is a schematic of another embodiment of the invention which utilizes synchronous detection.

FIG. 7 shows an indirect viewing system for ice on metal detection that uses a synchronous detection method that can operate with one photosensor or an array of photosensors, according to the field of view and resolution required. The illumination source for the surface area 15 to be inspected is not shown but it may be any bright source of either right handed or left handed circularly polarized light.

The area that is to be inspected is imaged via camera lens 400 onto photodiode 402, or onto an array of similar photo diodes. The circular polarizer required for isolation is formed by quarter wave retarder plate 42, linear polarizer 411 and Verdet rotator 401. The Verdet rotator is typically of garnet and energized by a magnetic field created by a coil 450 via power buffer amplifiers 402a and 402b which alternately drives current through the solenoid, first in one direction and then in the other. The effect is to cause linearly polarized light from the quarter wave plate passing through the rotator to change the direction of its polarization by plus or minus 45° according to the direction of the solenoid current flow. Other devices based on the Hall and/or Pockel's effect which use high voltage fields could be used in a similar manner.

In the static condition with no current flow through the coil 450, both right handed and left handed reflected circularly polarized light from area 15 will pass through the polarizer 411 to the photo diodes 402 with little attenuation because the slow axis of quarter wave plate 42 is in line with the polarization axis of linear polarizer 411. Therefore, light of either hand circular polarization is at 45° to the polarizer and so can pass through polarizer 411 without large attenuation. However, when the coil is alternately energized with current flow in opposite directions, the addition and subtraction of 45° to the plane of polarization present at the output of the quarter wave plate 42 causes the plane of polarization to alternate between vertical and horizontal at linear polarizer 411. Thus, reflected circularly polarized input light will alternately be allowed to pass and not pass to the photo diode detector.

Because the rotation of the plane of polarization is performed via current direction switching, it can be performed quite rapidly. A 10 KHz rate, which is adequate for the apparatus, is easily obtained. A clock source 406 provides pulses to a flip flop 403 at its toggle input 405. The flip flop 403 outputs 404a and 404b are amplified by buffers 402a and 402b to energize coil 450 in a direction that varies according to the state of the flip flop 403.

The optical energy received at the photo diode array 402 generates a corresponding electrical signal that is applied over input line 408 to a differential amplifier 407. The output 409 of amplifier 407 feeds two buffer amplifiers 410a and 410b via their inputs 411a and 411b. Both amplifiers 411 have equal gain but are of opposite polarity.

A multiplexer 413 has its inputs 414a and 414b connected to the two amplifier 410a and 410b outputs 412a and 412b. The multiplexer 413 directs its two inputs to its single output 415 according to the state of its select terminal 460 which is connected to output 404a of the flip flop 403. The output 415 of the multiplexer 413 is applied to an integrator 416 or optional low pass filter 426. The integrator 416 is formed by input resistor 420, operational amplifier 417, capacitor 421 and field effect transistor 422 which is used to periodically reset the integrator by discharging the capacitor. This arrangement is well known in the art. The integrator 416 (or filter 426) output 419, when greater than a threshold voltage positive or negative as set by a double end zener diode 480 will energize one of the oppositely poled LED's 424a or 424b.

The detection circuit of FIG. 7 rejects the light reflected from diffuse or ice covered areas but passes that from ice-free specular surfaces. Diffuse or ice covered surfaces return unpolarized light to the detector. With these type surfaces, although the current direction in the Verdet rotator 401 is changing direction at a 10 KHz rate, the light received by the photo diode 402 remains at a constant level—the light amplitude is unchanged because the light is not polarized.

The electrical voltage at the output 409 of amplifier 407 responds to the input level and remains constant. The multiplexer 415 alternately selects equal constant level positive and negative voltages so that the integrator 416 (or low pass filter 426) output stays close to zero and neither of the LED's 424a or 424b draw current since the output voltage does not overcome the zener diode 480 threshold voltage.

It can be seen that when area 15 is ice free the light returned to the apparatus will be circularly polarized and the signal at photo diode 402 will alternate between a large and small value at a 10 KHz rate. Since the two voltages selected at terminals 414a and 414b will differ in amplitude, they will not average to zero at the output of the integrator 416 (or low pass filter 426) and one of the LED's will light, according to whether the larger of the two voltages at point 409 was received when the state of flip flop 403's output 404a was high or low. This, in turn usually depends upon whether a right handed or left handed illuminator is being used. The output LED can also change if the area being observed receives most of its circularly polarized illumination indirectly via specular reflection from another surface, since each such reflection changes the state (hand) of the circular polarization.

The apparatus of FIG. 7, when used with a single photodetector is useful with a mechanical drive apparatus that scans the optical axis of the assembly in both elevation and azimuth to generate a raster scan which will create a full image of a scene on a point by point basis. The output 419 may be sent to a video display which is being scanned via its deflection circuits in synchronism with the mechanical drive apparatus to paint the image on the screen. As an alternative, the optical axis may be scanned in a raster pattern using azimuth and elevation deflecting galvanometer arrangements such as are available from General Scanning Corporation. Of course, such synthetically generated images may also be digitized and processed using the image processing hardware and software techniques previously described.

Figure 8A:
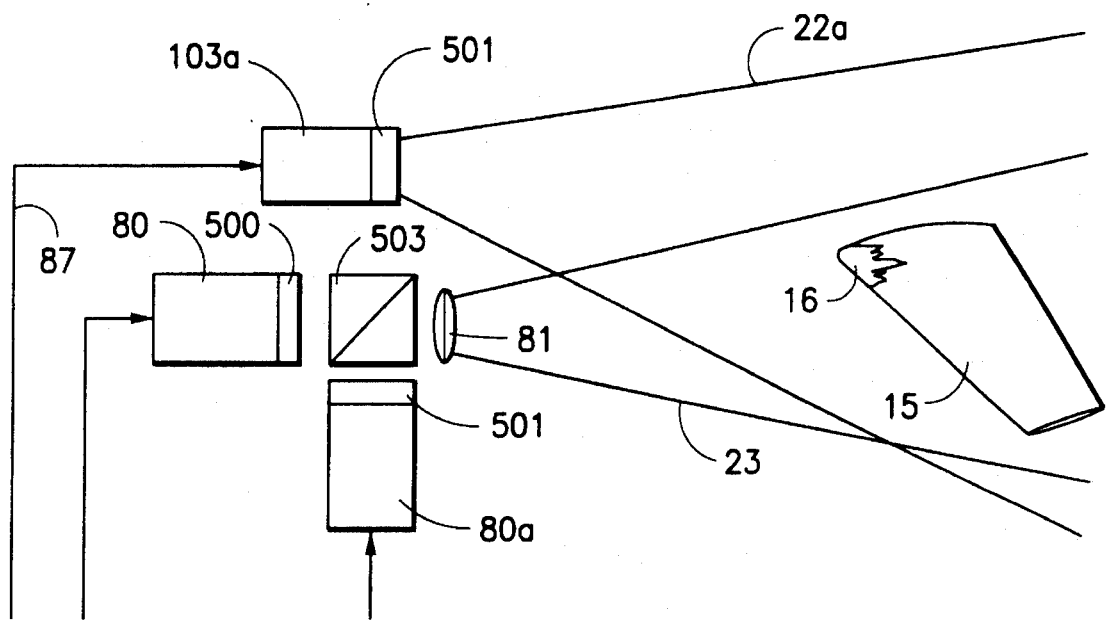
FIG. 8A is a schematic view of an embodiment which uses two video cameras and a beam splitter device.

FIG. 8A shows an embodiment of the invention useful when it is important to obtain ice detection information in an extremely rapid mode that is useful for scanning across an object in a short time without the smearing or the misregistration that nay occur when the camera is panning and sequential pictures are taken for the isolating and non-isolating modes.

In FIG. 8A, a strobe lamp 103a is used with linear polarizer 501 to illuminate the surface 11 via polarized light cone 22a. The video camera 80 with lens 81 images the scene as contained in field of view 23 which overlaps cone 22a. A polarization preserving beam splitter 503 is used to divide the energy received by lens 81 into two substantially equal amounts which are directed to video cameras 80 and 80a. Camera 80 is fitted with linear polarizer 500 which is in alignment with linear polarizer 501 so that reflected specular energy may pass with little loss and so creates a non-isolating mode receiver. Camera 80a also is fitted with a linear polarizer 501 but its axis is aligned at 90 degrees to that of linear polarizer 500 so that reflected specular energy is blocked which creates an isolating mode receiver.

When the synchronizing pulse is received via wire 87, the strobe lamp 103a flashes for a brief time; 10 microseconds is typical. During the brief flash interval the isolating and nonisolating images are captured on the silicon CCD devices (typical) in the two cameras, 80a and 80, respectively. The two images can be read out sequentially via a multiplexer and recorded in the digital frame buffers of the image processor. A multiplexer of the type required is built into the Cognex 4400 and is normally part of most commercial frame grabbers and image processors. The processing of the images is substantially the same as previously described with amplitude comparisons being made between corresponding pixels or corresponding regions.

Because the two cameras use a common lens 81 the images will have top and bottom reversed (one is viewed through a mirror) but are otherwise substantially geometrically identical. Calibration may be obtained by recording any two points in the field of view and mechanically adjusting the CCD chips via translation and rotation to have a one to one correspondence of pixels. This can also be accomplished via software within the image processor and such conventional soft-ware is normally furnished with the image processor. Because the lens 81 and cameras 80 and 80a are held in alignment, the calibration, whether via mechanical or software means, need only be performed once, at the factory.

In FIG. 8A, the linear polarizers may be replaced with circular polarizers such that at least one of the circular polarizers in the receiver has the same "hand" as that of the transmitter to provide an isolating mode image and the other has the opposite "hand" or not be circularly polarizing and have suitable attenuation to ensure that diffuse objects have the same intensity in both pictures. Additionally, if polarizing beam splitters are used, one or more of the polarizers in the receivers may be omitted since polarizing beam splitters will divide energy according to polarization properties.

In FIG. 8A, the isolating and non-isolating images may be obtained with two separate cameras as shown, but with two separate and substantially matched (in focal length and axis parallelism) lens means, one per camera, that create geometrically corresponding images. The correspondence need not be exact if corresponding image features or regions or pixel groups are compared with respect to average amplitude in the isolating and non-isolating mode.

Figure 8B:
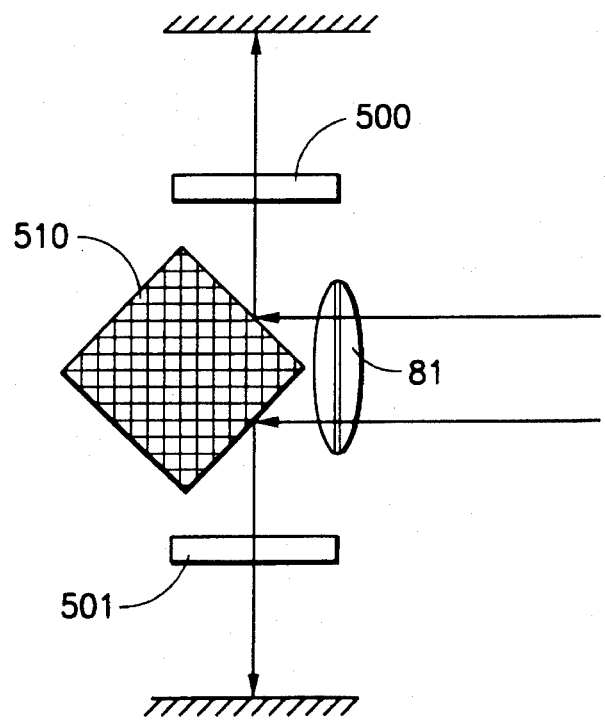
FIG. 8B is a schematic view of the optical path of FIG. 8A using two mirrors to replace the beam splitter device of FIG. 8A.

An alternative arrangement shown in FIG. 8B, section view, uses a mirror 510 in each path and so does not invert one image with respect to the other.

As can be appreciated, the camera in all embodiments may be replaced with a multiplicity of cameras at various positions and angles to the illuminated surface to gather more of the specularly reflected light and similarly, a multiplicity of illuminators may be used at various positions and angles to the illuminated surface to assist the cameras in gathering more of the specularly reflected light. It is only necessary that when such arrangements are used that all control signals and polarizers be common to the group of cameras that replaces one camera or to the group of illuminators that replaces one illuminator.

The arrangements of FIG. 8A and FIG. 8B require multiple cameras and beam splitters which are similar to first generation color cameras which employed three separate cameras to separately record three separate images, one for each of the primary colors. More modern color cameras employ a single camera with a patterned color filter that is organized in closely spaced columns; e.g., R,G,B,R,G,B,R, G,B . . . where R represents red, G represents green and B represents blue. This has the advantage of using only one camera plus simple electronics and requires a one time adjustment of the filter to the camera chip at the factory. The same identical color camera pickup chip and electronics circuits may be used to manufacture a polarization sensitive camera by replacing the tri-color filter used in the color camera with the two layer filter shown in the assembly of FIG. 9A.

Figure 9A:
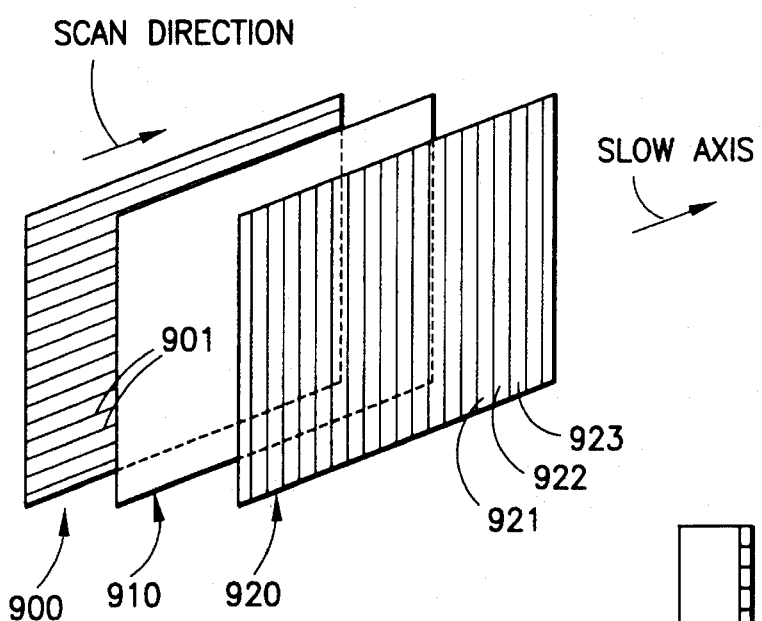
FIG. 9A is a schematic view of a polarization sensitive camera based upon a variation of color camera technology which is particularly suitable for use in the receive path.

In FIG. 9A, the camera pickup is represented by CCD chip 900 with typical scan lines 901. A thin linear polarizer 910 with polarization axis at 45 degrees to the "slow" axis defined for patterned retarder plate 920 is located touching, or in close proximity to the illuminated surface of the CCD chip. Retarder plate 920 is manufactured from a birefringent material and selectively etched so that adjacent columns differ by ¼ wave with respect to the retardation produced and a pattern of +,0,−,+,0,−,+,0,−, . . . is maintained where + represents +¼ wave (923), 0 represents equality of phase (922), and − represents − ¼ wave (921). The patterned retarder plate must be in close proximity to the polarizing plate. The retarder plate selective etching may be done chemically or with ion beams and is well known in the semiconductor industry. The process is currently being used to create micro lens arrays known as binary optics.

Figure 9B:
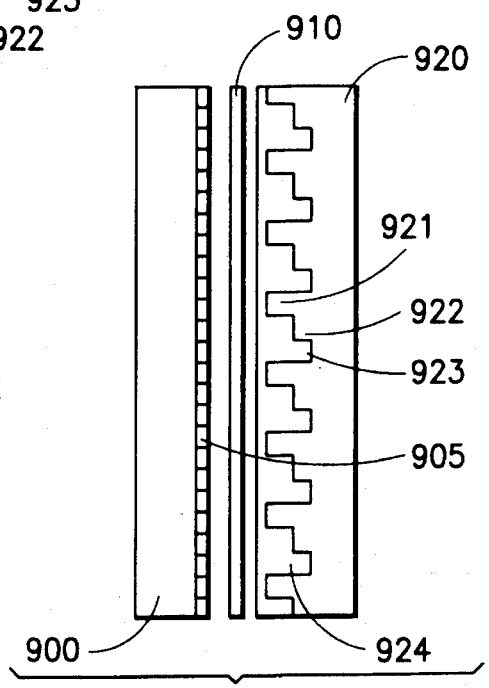
FIG. 9B is a section view of details of the polarization sensitive camera.

The arrangement shown in FIG. 9B requires two mask and etch steps to obtain the three thicknesses needed for manufacturing the three retardations needed for the three column types. The optional filling 924 adds non birefringent material laying an optical index approximately equal to that of the birefringent material to provide the overall structure of a thin glass plate with respect to a focused light beam. As shown in FIG. 9B, the columns are brought into alignment with the pixels 905 in a CCD column in exactly the same manner as is done for a color camera.

In operation, the polarization images produced by the patterned retarder plate will be processed by the color cameras electronic circuits into either three separate images or a single composite image. In the case that a single composite image results, it can be decoded by any color receiver into corresponding R,G,B images which will represent not the three colors but the three states of circular polarization received which correspond to left, right and non polarized. These images may be processed according to all of the preceding methods regarding ice detection.

Although all cameras shown have been of rectangular format, in some circumstances it may be preferable that a linear camera array (single row of pixels) be used and the field of view be transversely scanned via rotating polygon mirrors, galvanometers, rotating prisms, or other scanning means to synthesize a rectangular image of some desired format. At such times the illuminator may provide a "line of light" which would be likewise scanned in synchronism with the scanning of the linear array. This is suitable for fields of view which may be long and narrow and require more resolution than may be obtained from the standard camera format.

The invention is to facilitate ease of use and promote record keeping which is of vital importance to the aviation safety industry. Although not shown in the various drawings, it is anticipated that flight number, aircraft identification, time and date and other pertinent information would be aurally, visually, or textually annotated to the display monitors and to the disk or tape recordings made with the ice detection equipment. The performance of this task would be implemented with commercially available components that are often part of the equipment specified (cameras and recorders) or via additional "plug compatible" annotation and editing devices.

It may be desirable to locate the recording and viewing or control equipments at remote locations such as the aircraft cabin, control tower, ground control area, or aircraft terminal. Cameras and illuminators may also be built into various remote portions of the aircraft from which the wing or other surface is to be monitored. Accordingly, the various wires shown in the drawings, whether for purposes of data or signal transfer or control, may be replaced with telemetry equipment operating via radio, infra-red, power lines or fiber optic links.

Although the equipment described separates clear wing from ice and snow, it does not separate (except visually to the operator's eye) runway and other background surfaces from ice covered wing surfaces, etc. This can be done via image processing techniques or stereo ranging. Image processing techniques to be employed would segment surfaces of like color or texture and only color red those "non-blinking" areas that are substantially surrounded by "blinking" areas (green). That is, ice would be highlighted only when substantially surrounded by clear metal. As an alternative, 3-D triangulation, stereo ranging, color or surface texture information may be used to separate foreground from background and only the foreground (wing or other aircraft surface) have non-blinking areas tagged to highlight ice formation.

What is claimed:

1. A retarder plate for a television camera comprising:

said camera including a plurality of pixels;

said retarder plate being disposed before said plurality of pixels;

a linear polarizer between said plurality of pixels and said retarder plate;

said retarder plate including a first plurality of first regions having a first optical thickness;

said retarder plate including a second plurality of second regions having a second optical thickness;

said first optical thickness and said second optical thickness differing from each other by a multiple of one quarter of an optical wavelength;

said first plurality being aligned before a first subset of said plurality of pixels; and said second plurality being aligned before a second subset of said plurality of pixels, whereby said linear polarizer and said first and second regions produce two of left-hand polarization, right-hand polarization, and non-polarization.

2. A retarder plate according to claim 1, wherein:

said retarder plate further comprises a third plurality of third regions having a third optical thickness;

ones of said first regions, said second regions and said third regions being disposed in a side-by-side repeating pattern, each aligned with corresponding ones of said plurality of pixels;

said first optical thickness being an integral multiple of a half wavelength plus one quarter wavelength;

said second optical thickness being an integral multiple of a half wavelength; and said third optical thickness being an integral multiple of a half wavelength minus one quarter wavelength, whereby left-hand polarization, right-hand polarization and non-polarization is delivered in a repeating pattern to said plurality of pixels.

3. A retarder plate according to claim 2, further comprising:

said television camera being a color television camera from which a color filter, of a type filtering for red (R), green (G) and blue (B) has been removed;

said first plurality being aligned in place of said red color filter;

said second plurality being aligned in place of said green color filter; and said third plurality being aligned in place of said blue color filter, whereby an output of said color television camera, processable by normal color television circuits, includes separate responses to left-hand polarization, right-hand polarization, and non-polarization.

4. A television system comprising:

a color television camera from which color filtering for red (R), green (G) and blue (B) colors has been removed;

a retarder plate in front of said color television camera;

a linear polarizer between said color television camera and said retarder plate;

said retarder plate including a plurality of first regions, corresponding to said color filtering for red;

said retarder plate including a plurality of second regions, corresponding to said color filtering for green;

said retarder plate including a plurality of third regions, corresponding to said color filtering for blue;

said first regions having an optical thickness equal to an integral multiple of a half wavelength of light, minus one quarter wavelength;

said second regions having an optical thickness equal to an integral multiple of a half wavelength of light; and said third regions having an optical thickness equal to an integral multiple of a half wavelength of light, plus one quarter wavelength.

* * * * *